United States Patent
Oles et al.

(10) Patent No.: US 6,571,225 B1
(45) Date of Patent: May 27, 2003

(54) TEXT CATEGORIZERS BASED ON REGULARIZING ADAPTATIONS OF THE PROBLEM OF COMPUTING LINEAR SEPARATORS

(75) Inventors: Frank J. Oles, Peekskill, NY (US); Tong Zhang, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,578

(22) Filed: Feb. 11, 2000

(51) Int. Cl.[7] .............................................. G06F 15/18
(52) U.S. Cl. ............................................ 706/12; 707/7
(58) Field of Search ............................ 706/14, 12, 45; 707/7

(56) References Cited

U.S. PATENT DOCUMENTS 6,278,996 B1 * 8/2001 Richardson et al. ........... 707/6

OTHER PUBLICATIONS

IBM Corporation, PDF file located at http://www.publib.boulder.ibm.com/pubs/pdfs/crm/Mail Analyzer.pdf and downloaded from web pages located at http://www-4.ibm.com, publication date unknown.

R. Schapire et al., "Boosting the margin ", a new explanation for the effectiveness of voting methods, The Annals of Statistics, 26:1651–1686 (1998).

C. Apte, et al., "Automated Learning of Decision Rules for Text Categorization", *ACM Transactions for Information Systems*, 12:233–251, 1994.

P.L. Bartlett, "The Sample Complexity of Pattern Classification With Neural Networks: The Size of the Weights is More Important than the Size of the Network", *IEEE Transactions on Information Theory*, 44(2):525–536, 1998.

S. Dumais, et al., "Inductive Learning Algorithms and Representations for Text Categorization", Technical Report, Microsoft Research, 1998.

A.N. Kolmogorov, et al., "$\epsilon$–Entropy and $\epsilon$–Capacity of Sets in Functional Spaces", *Amer. Math. Soc. Transl.*, 17(2):277–364, 1961.

N. Sauer, "On the Density of Families of Sets", *Journal of Combinatorial Theory (Series A)*, 13:145–147, 1972.

V.N. Vapnik et al., "On the Uniform Convergence of Relative Frequencies of Events to Their Probabilities", *Theory of Probability and Applications*, 16:264–280, 1971.

S.M. Weiss, et al., "Maximizing Text–Mining Performance", *IEEE Intelligent Systems*, Jul./Aug. 1999.

(List continued on next page.)

*Primary Examiner*—John Follansbee
*Assistant Examiner*—Joseph P. Hirl
(74) *Attorney, Agent, or Firm*—Whitham, Curtis & Christofferson, P.C.; Stephen C. Kaufman

(57) ABSTRACT

A method to automatically categorize messages or documents containing text. The method of solution fits in the general framework of supervised learning, in which a rule or rules for categorizing data is automatically constructed by a computer on the basis of training data that has been labeled beforehand. More specifically, the method involves the construction of a linear separator: training data is used to construct for each category a weight vector w and a threshold t, and the decision of whether a hitherto unseen document d is in the category will depend on the outcome of the test $w^T x \geq t$, where x is a vector derived from the document d. The method also uses a set L of features selected from the training data in order to construct the numerical vector representation x of a document. The preferred method uses an algorithm based on Gauss-Seidel iteration to determine the weight factor w that is determined by a regularized convex optimization problem derived from the principle of minimizing modified training error.

22 Claims, 8 Drawing Sheets

OTHER PUBLICATIONS

Y. Yang, et al., "A Comparative Study on Feature Selection in Text Categorization", In ICML'97. *Proceedings of the Fourteenth International Conference on Machine Learning*, 1997.

Y. Yang, "An Evaluation of Statistical Approaches to Text Categorization", *Information Retrieval Journal*, 1998.

Y. Yang et al., "An Example–Based Mapping Method for Text Categorization and Retrieval", *ACM Transactions on Information Systems*, 12:252–277, 1994.

T. Zhang, "Analysis of Regularized Linear Functions for Classification Problems".

IBM Software, "IBM CRM Application Software", pub. date unknown, web pages from http://www.4.ibm.com.

David Lewis, "The Reuters–21578 Text Categorization Test Collection", pub date unknown, web pages from http://www.reseach.att.com.

Corepoint, "Corepoint Mail Analyzer for Windows NT and AIX, Programmer's Reference, Version 6.2", IBM Corporation, Jun. 25, 1999.

IBM Software, "IBM Mail Analyzer", pub. date unknown, web pages from http://www./4.ibm.com.

* cited by examiner

TEXT CATEGORIZERS BASED ON REGULARIZING ADAPTATIONS OF THE PROBLEM OF COMPUTING LINEAR SEPARATORS

BACKGROUND OF THE INVENTION

1. Field of the Invention

The present invention generally relates to supervised learning as applied to text categorization and, more particularly, to a method for categorizing messages or documents containing text.

2. Background Description

The text categorization problem is to determine predefined categories for an incoming unlabeled message or document containing text based on information extracted from a training set of labeled messages or documents. Text categorization is an important practical problem for companies that wish to use computers to categorize incoming e-mail (electronic mail), thereby either enabling an automatic machine response to the e-mail or simply assuring that the e-mail reaches the correct human recipient. But, beyond e-mail, text items to be categorized may come from many sources, including the output of voice recognition software, collections of documents (e.g., news stories, patents, or case summaries), and the contents of web pages.

Any data item containing text is referred to as a document, and the term herein is meant to be taken in this most general sense.

The text categorization problem can be reduced to a set of binary classification problems—one for each category—where for each one wishes to determine a method for predicting in-class versus out-of-class membership. Such supervised learning problems have been widely studied in the past. Recently, many methods developed for classification problems have been applied to text categorization. For example, Chidanand Apte, Fred Damerau, and Sholom M. Weiss in "Automated learning of decision rules for text categorization", *ACM Transaction on Information Systems*, 12:233–251 (1994), applied an inductive rule learning algorithm, SWAP1, to the text categorization problem. Yiming Yang and Christopher G. Chute in "An example-based mapping method for text categorization and retrieval", *ACM Transactions on Information Systems*, 12:252–277 (1994), proposed a linear least square fitting algorithm to train linear classifiers. Yiming Yang also compared a number of statistical methods for text categorization in "An evaluation of statistical approaches to text categorization", *Information Retrieval Journal*, 1:66–99 (1999). The best performances previously reported in the literature are from weighted resampled decision trees (i.e., boosting) in "Maximizing text-mining performance" by S. M. Weiss, C. Apte, F. Damerau, D. E. Johnson, F. L. Oles, T. Goetz, and T. Hampp, *IEEE Intelligent Systems*, 14:63–69 (1999), and support vector machines in "Inductive learning algorithms and representations for text categorization" by S. Dumais, J. Platt, D. Heckerman, and M. Sahami, Technical Report, Microsoft Research (1998). However, training the classifier in these approaches is much slower than the method we will be presenting here.

Common to all these approaches is the use of a numeric vector to represent a document. This can be done in many ways. Because of the vast numbers of different words that may appear in text, generally one gets sparse vectors of very high dimensionality as document representations. Thus, text categorization necessitates using techniques of supervised learning that are well suited to high dimensional data.

Formally, a two-class pattern recognition problem is to determine a label $y \in \{-1, 1\}$ associated with a vector x of input variables. A useful method for solving this problem is by using linear discriminant functions, which consist of linear combinations of the input variables. Various techniques have been proposed for determining the weight values for linear discriminant classifiers from a training set of labeled data $(x_1, y_1), \ldots, (x_n, y_n)$. Here, and throughout this document, n is the number of items in a training set. Specifically, desired are a weight vector w and a threshold t such that $w^T x > t$ if its label $y=-1$ and $w^T x \geq t$ if its label $y=1$. Here, the notation $w^T x$ means the product using matrix multiplication of the transpose of the column vector w and the column vector x, which is the same as the inner product w and x, which is the same as the dot product of w and x. Thus, the hyperplane consisting of all x such that $w^T x = t$ would approximately separate the in-class vectors from the out-of-class vectors.

The problem just described may readily be converted into one in which the threshold t is taken to be zero. One does this by embedding all the data into a space with one more dimension, and then translating the original space by some chosen nonzero distance A from its original position. Normally, one takes A=1. Hence, in this conversion, each vector $(z_1, \ldots, z_m)$ is traded in for $(z_1, \ldots, z_m, A)$. For each hyperplane in the original space, there is a unique hyperplane in the larger space that passes through the origin of the larger space. Instead of searching for both an m-dimensional weight vector along with a threshold t, one can therefore search for an (m+1)-dimensional weight vector along with an anticipated threshold of zero.

Under the assumption that the vectors of input variables have been suitably transformed so that we may take t=0, the training error rate for a linear classifier with weight vector w is given by $$\frac{1}{n}\sum_{i=1}^{n} f(w^T x_i y_i), \quad (1)$$

where f is the step function $$f(x) = \begin{cases} 1 & \text{if } x \leq 0, \\ 0 & \text{if } x > 0. \end{cases} \quad (2)$$

A number of approaches to solving categorization problems by finding linear discriminant functions have been advanced over the years. In the early statistical literature, the weight was obtained by using linear discriminant analysis, which makes the assumption that each class has a Gaussian distribution (see, for example, B. D. Ripley, *Pattern Recognition and Neural Networks*, Cambridge University Press (1996), chapter 3). Similar to linear discriminant analysis, an approach widely used in the neural net community is the least square fitting algorithm. Least square fitting has been applied to text categorization problems as described by Yiming Yang et al., supra. Without any assumption on the distribution, a linear separator can be obtained by using the perceptron algorithm that minimizes training error as described by M. L. Minsky and S. A. Papert in *Perceptrons*, Expanded Ed., MIT Press, Cambridge, Mass., (1990).

In an attempt to deal with the problem of overfitting the training data, some newer techniques have a theoretical basis in the analysis of the generalization error of classification methods that aim to minimize the training error. This analysis often involves a concept called VC dimension, which was originally discovered by V. N. Vapnik and A. J. Chervonenkis in "On the uniform convergence of relative frequencies of events to their probabilities", *Theory of Probability and Applications*, 16:264–280 (1971), and, independently, by N. Sauer in "On the density of families of sets", *Journal of Combinational Theory (Series A)*, 13:145–147 (1972). However, in general, the VC-dimension is proportional to the dimension d of the underlying variable x. Vapnik later realized that by restricting the magnitude of the weights, it is possible to achieve generalization performance which is independent of d (V. N. Vapnik, *The Nature of Statistical Learning Theory*, Springer-Verlag, New York (1995)). The idea of restricting the magnitude of the weights has been known in the neural net community, and was analyzed by P. L. Bartlett in "The sample complexity of pattern classification with neural networks: the size of the weights is more important than the size of the network", *IEEE Transactions on Information Theory*, 44(2):525–536 (1998).

It is also known that the generalization performance of a linear classifier trained to minimize the training error is determined by its capacity, which can be measured by the concept of covering number, originally studied by A. N. Kolmogorov and V. M. Tihomirov, "$\epsilon$-entropy and $\epsilon$-capacity of sets in functional spaces", *Amer. Math. Soc. Transl.*, 17(2):277–364 (1961). In learning theory, the VC-dimension is used to bound the growth rate of covering numbers as a function of sample size. It can be shown that the average generalization performance of a linear classifier obtained from minimizing training error is $\tilde{O}(\sqrt{d/n})$more than the optimal generalization error when the training set consisted of n examples. (The notation $\tilde{O}$ here indicates that the hidden factor may have a polynomial dependence on log(n).) Clearly, if d is large as compared to n, then the generalization performance from the perceptron algorithm will be poor. Unfortunately, large dimensionality is typical for many real-word problems such as text-classification problems, which can have tens of thousands of features. Vapnik realized that by using regularization techniques originated from the numerical solution of ill-posed systems, as described, for example, by A. N. Tikhonov and V. Y. Arsenin in *Solution of Ill-Posed Problems*, W. H. Winston, Washington, D.C. (1977), one can avoid the dimensional dependency and thus achieve better generalization performance for certain problems, as described in V. N. Vapnik, *Estimation of Dependencies Based on Empirical Data*, Springer-Verlag, New York (1982), translated from the Russian by Samuel Kotz, and V. N. Vapnik, *The Nature of Statistic Learning Theory*, Springer-Verlag, New York (1995).

In *The Nature of Statistical Learning Theory*, Vapnik examined another method to train linear classifiers which he called the "optimal separating hyperplane" algorithm. The algorithm restricts the 2-norm of the vector of weights and it produces a linear classifier that gives a proper separation of the two classes, assuming there exists a perfect separation by a hyperplane. A quadratic programming formulation has been derived accordingly, which he called the support vector machine, or SVM. It has been demonstrated that the VC dimension associated with the SVM formulation depends on sup $\|w\|_2$ sup $\|x\|_2$ where sup $\|w\|_2$ is the maximum of the 2-norms of the weights of the linear classifiers under consideration, and sup $\|x\|_2$ is the maximum 2-norm of training data. More recently, Bartlett, supra, has studied the generalization performance of restricting 1-norm of the weight and $\infty$-norm of the data, and he obtained for his approach a generalization performance of $\tilde{O}(\log(d)/\sqrt{n})$ more than the optimal generalization error. A similar argument has been applied by R. E. Schapire, Y. Freund, P. Bartlett, and Wee Sun Lee in "Boosting the margin: a new explanation for the effectiveness of voting methods", *The Annals of Statistics*, 26:1651–1686 (1998) to explain the effectiveness of the boosting algorithm.

SUMMARY OF THE INVENTION

It is therefore an object of the present invention to provide a method to automatically categorize messages or documents containing text.

According to the invention, a method of solution fits in the general framework of supervised learning, in which a rule or rules for categorizing data is automatically constructed by a computer on the basis of training data that has been labeled beforehand. More specifically, the method involves the construction of a linear separator: training data is used to construct for each category a weight vector w and a threshold t, and the decision of whether a hitherto unseen document d is in the category will depend on the outcome of the test $$i^T x \geq t,$$

where x is a vector derived from the document d. The method also uses a set L of features selected from the training data in order to construct the numerical vector representation x of a document.

The technique employed for obtaining the weight vector and a preliminary value for the threshold from the training data is new, and so consequently, is also the application of this technique to text. Also not taught by the prior art is the step in which the preliminary value of the threshold in a linear classifier can be altered to improve the performance of the classifier as measured by the text-related measures of precision and recall (or other measures), as opposed to the measure of classification error that is pervasive in supervised learning. If the measure of importance were classification error, then altering the threshold after its initial determination would be somewhat at odds with the derivation of the technique.

In summary the present invention is a method for categorizing text by modifying the training error for a set of training documents in order to derive a convex optimization problem from the modified training error. Once the problem has been defined, it is regularized and then solved by relaxation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Introduction

Figure 1:
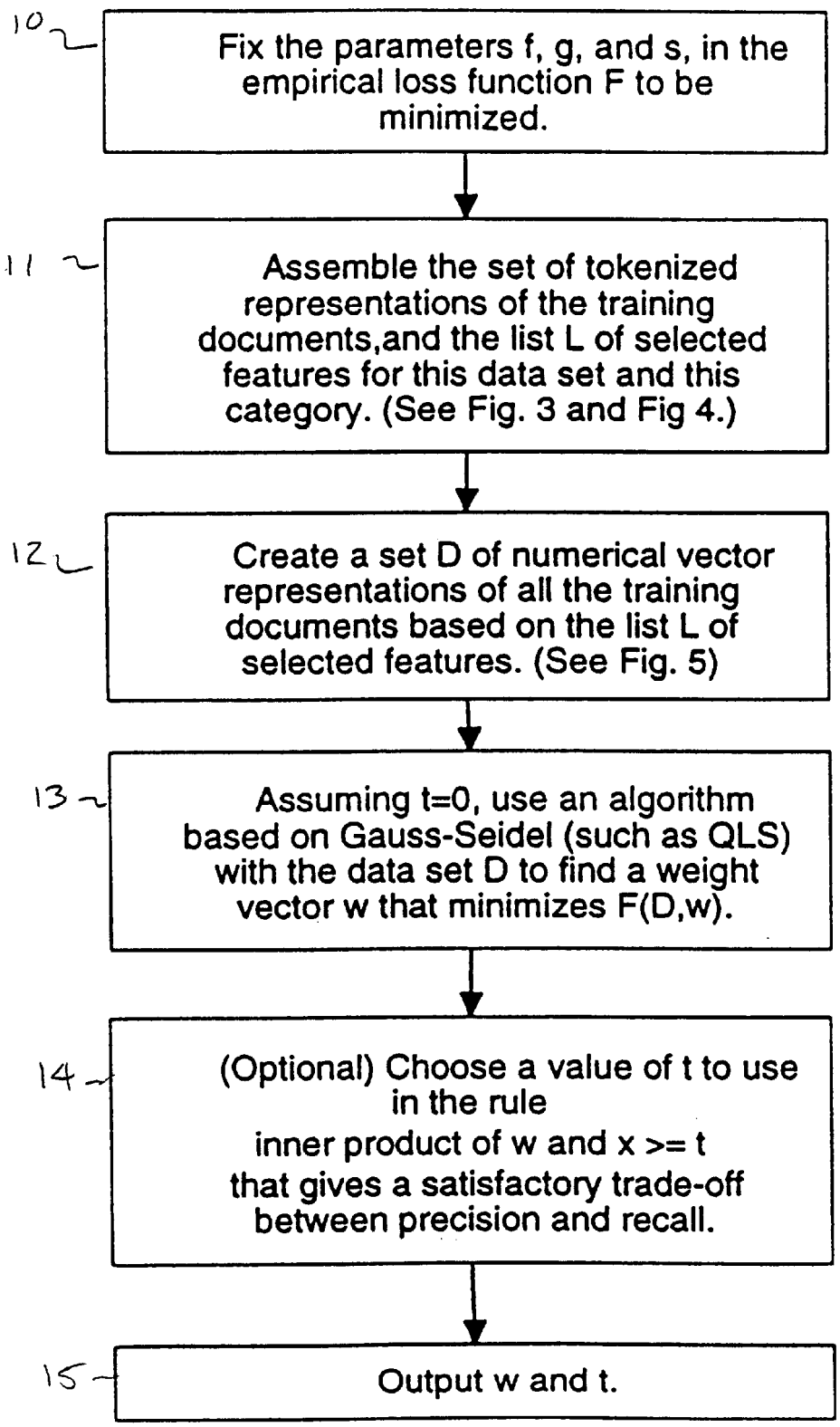
FIG. 1 is a flow diagram showing the steps that to be carried out to implement supervised learning of a weight vector w for a particular category, using a set of vectors derived from categorized training documents.
Figure 2:
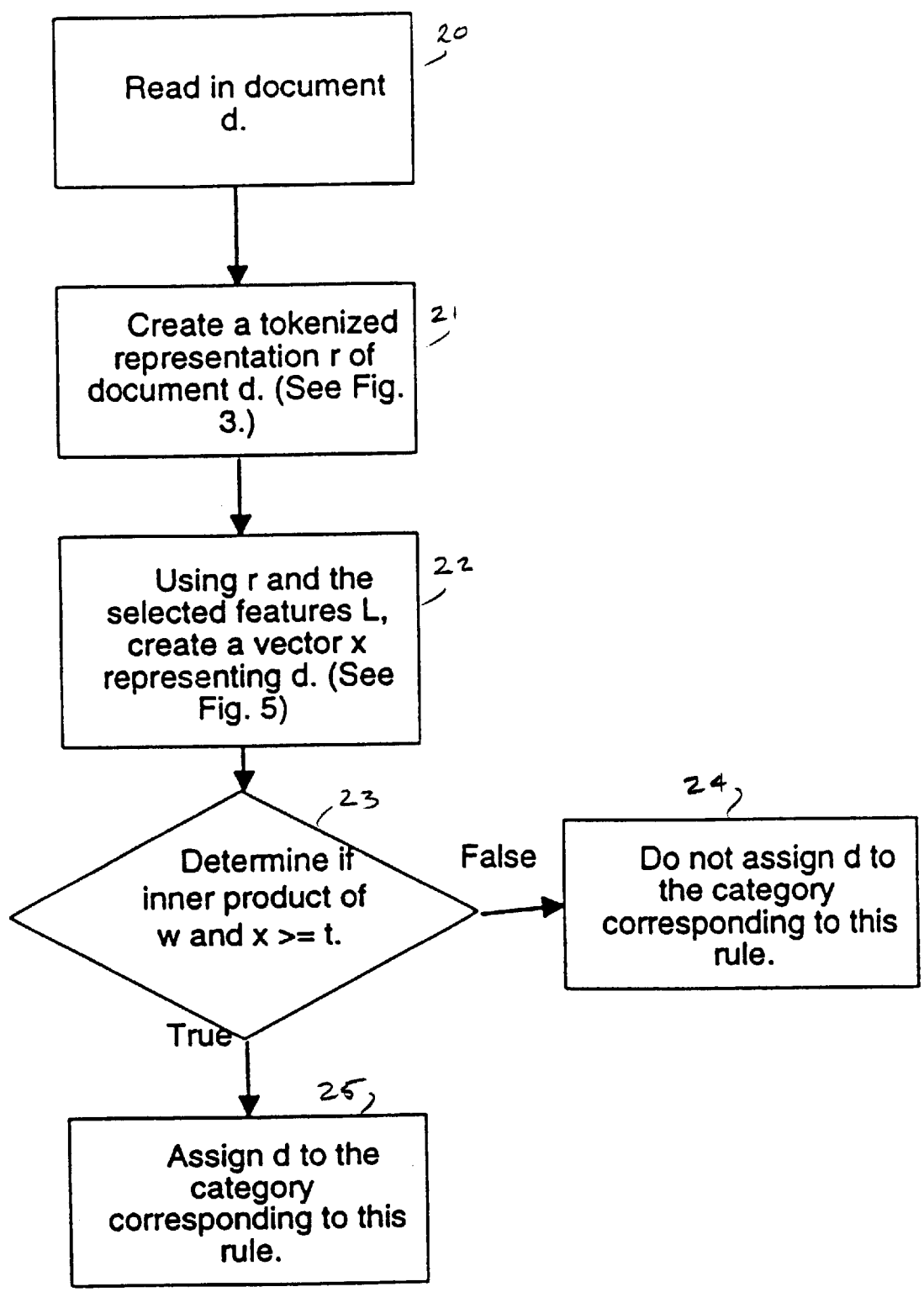
FIG. 2 is a flow diagram illustrating the steps to be carried out in using a weight vector w and a threshold t for a category, and a set L of features selected during training to determine a prediction of whether an uncategorized document is or is not in that category.

A means of developing a categorizer, as shown in FIG. 1, and the means by which the categorizer is to be used to categorize documents, as shown in FIG. 2, are now described.

Figure 6:
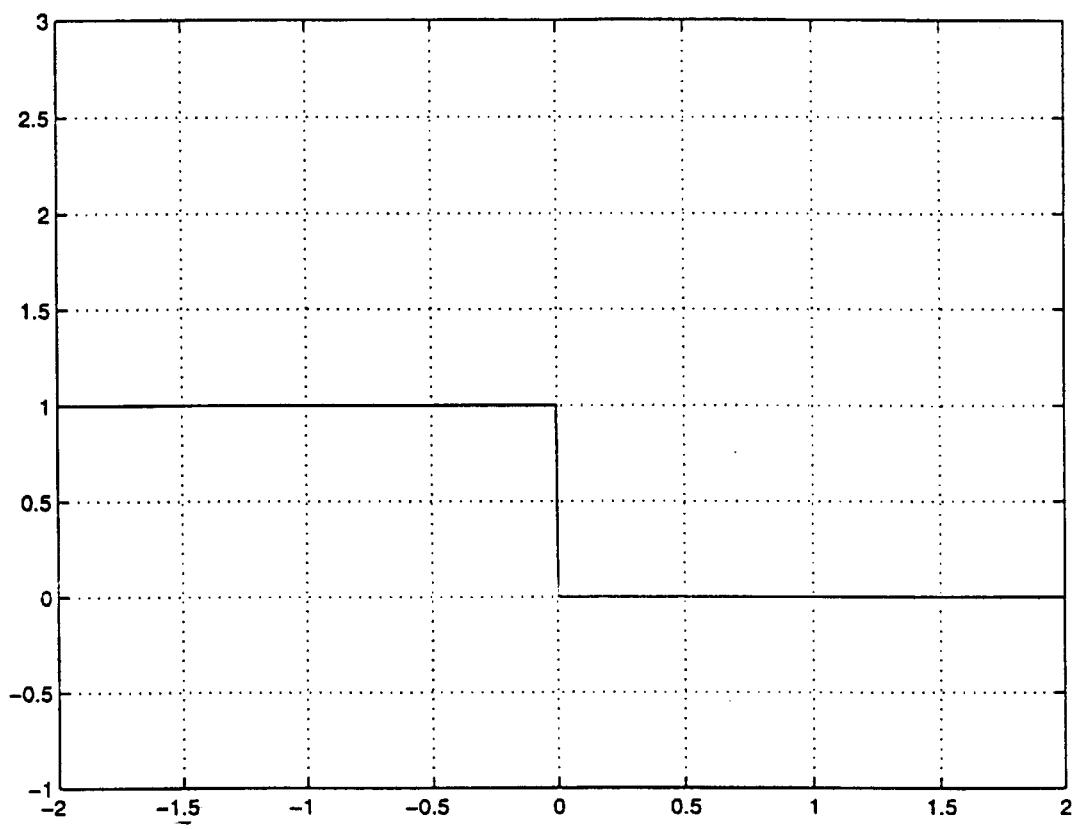
FIG. 6 is a graph showing the step function f that can be used to express the training error when it is computed using a particular weight vector w.

Referring to the drawings, and more particularly to FIG. 1, a flow diagram is shown describing a method for obtaining the weight vector and the threshold from a categorized data set, the training data, for a category chosen beforehand. Integral parts of training are tokenization, feature selection, and creating vector representations of documents. The first step is to fix the functional parameters f and g and the constant parameter s in function block 10. The functional parameter f is an appropriate convex smooth approximation to the step function that is usually used in expressing the training error of a classifier. FIG. 6 shows the graph of the step function f given by $$f(x) = \begin{cases} 1 \text{ if } x \leq 0, \\ 0 \text{ if } x > 0 \end{cases}$$

that can be used to express the training error $$\frac{1}{n}\sum_{i=1}^{n} f(w^T x_i y_i).$$

Figure 7:
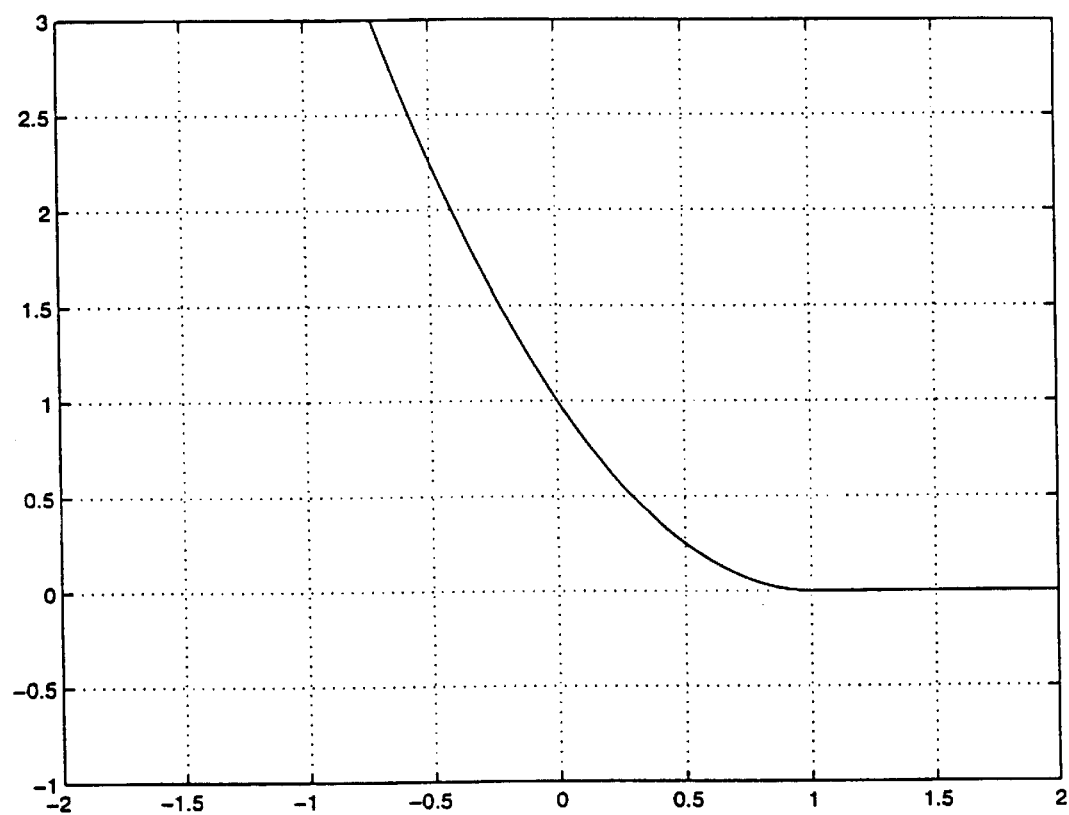
FIG. 7 is a graph showing a typical smooth, convex function f to replace the step function of FIG. 6, as called for by the method according to the invention.
Figure 8:
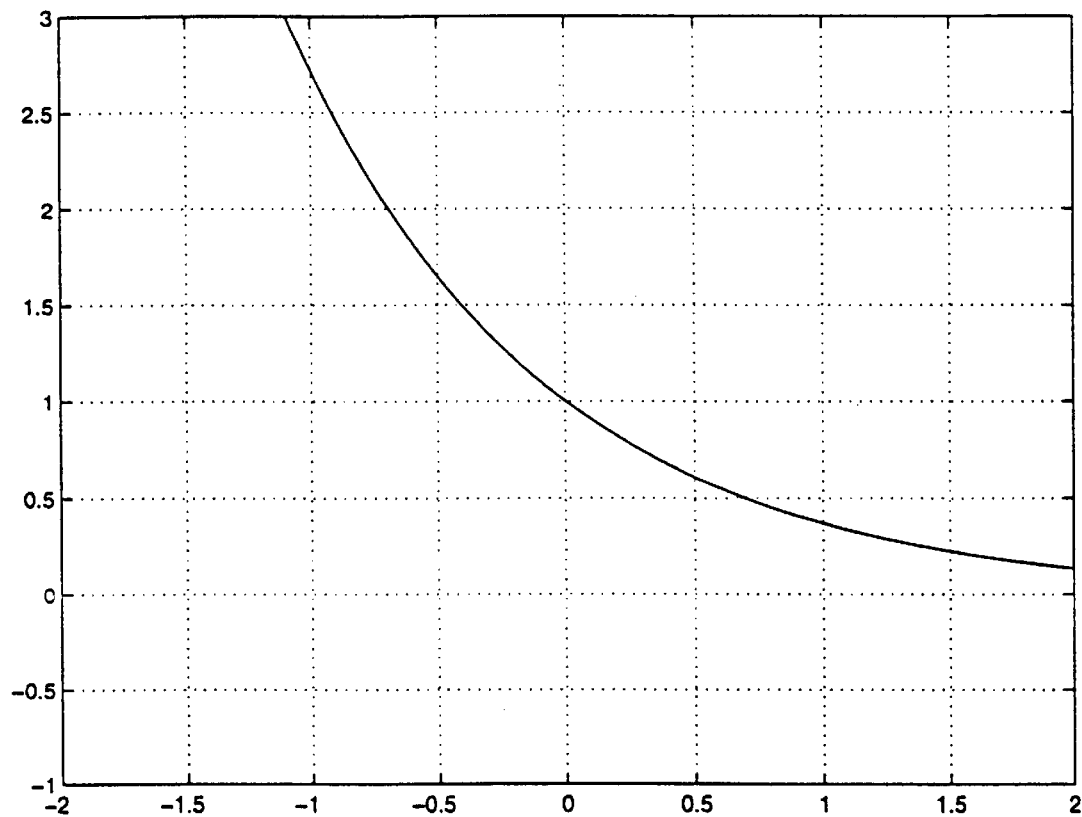
FIG. 8 is a graph showing another typical smooth, convex function f to replace the step function of FIG. 4, as called for by the method according to the invention.

The approximating function f should be greater than or equal to the step function. Graphs of examples of such approximations are shown in FIG. 7 and FIG. 8. FIG. 7 shows the graph of a typical smooth, convex function f to replace the step function of FIG. 6, as called for by the method of the present invention. In this case, $$f(x) = \begin{cases} (1-x)^2, & x \leq 1, \\ 0, & x > 1. \end{cases}$$

Figure 4:
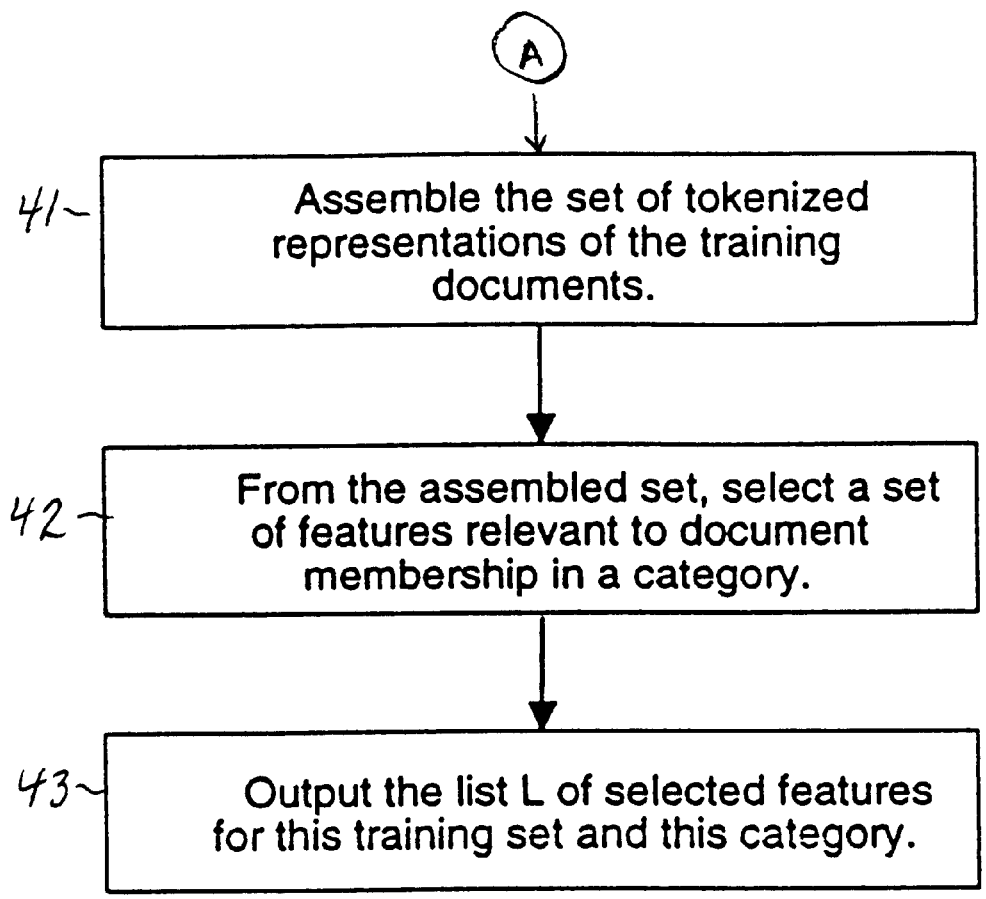
FIG. 4 is a flow diagram showing the steps necessary to carry out feature selection.

FIG. 8 shows the graph of another typical smooth, convex function f to replace the step function of FIG. 4, as called for by the present method. In this case $f(x)=e^{-x}$. This function illustrates that it is not strictly necessary for the approximation function to agree precisely with the step function at x=0 and x=1.

Figure 3:
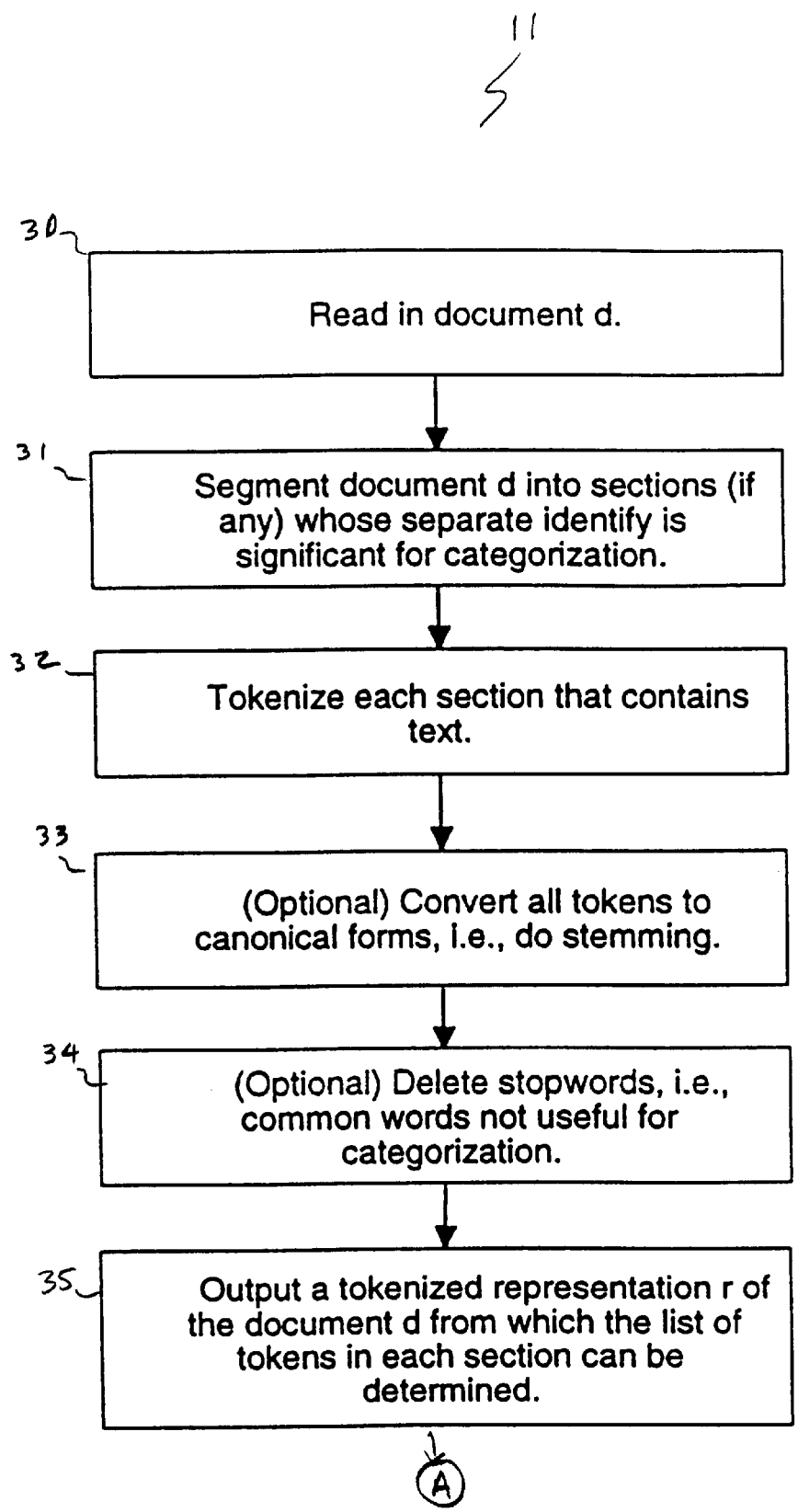
FIG. 3 is a flow diagram illustrating the steps that may be taken in determining a numerical vector representation of a text document.

Proper choice of the functional parameter g enables constraint of the weight vector w. To simplify the computation in function block 13, the function g should be a smooth function expressible as a sum of real-valued functions, each real-valued function being a function of exactly one component of the weight vector. An appropriate choice for g would be the p-th power of the p-norm of the weight vector, which also gives the possibility of regularizing an ill-posed optimization problem. The constant parameter s should be a small positive real number whose role is to establish a balance in the resulting optimization problem between the desire to minimize the error rate on the training data and the desire to ensure the weights are not too large. In practice, s=0.001 is found to be a good choice, although other values may work well, too. These three parameters determine a specific optimization problem: to find the value of the weight vector w such that the empirical loss function $$F(D, w) = F_{f,g,s}(D, w) = \frac{1}{n}\sum_{i=1}^{n} f(w^T x_i y_i) + sg(w) \qquad (3)$$

is minimized, where the $$D = \{(x_1, y_1), \ldots, (x_n, y_n)\}$$

is the set of vectors derived from the categorized training documents. A computer is not necessary to perform the required calculations in function block 10. In practical situations, the upcoming steps in function blocks 11, 12 and 13 would require a computer to be carried out. An initial processing of the training data is performed in function block 11, consisting of tokenization, as described in FIG. 3, followed by feature selection (i.e., determination of a set of features of documents that are relevant for categorization), as described in FIG. 4. A set D of numerical vector representations of the documents in the training data that is based on the list of selected features is created in function block 12. For a given document and a given list of selected features, the procedure for creating a numerical vector representation is described in FIG. 5. The algorithm based on Gauss-Seidel iteration is used in function block 13 to find a weight vector w that minimizes the empirical loss function constructed in function block 10. The details of this algorithm will, of course, depend on the choice of the parameters f, g, and s. Full details about the algorithm to be implemented for particular values off, g, and s are given below. The weight vector is found in function block 13 and can be used for categorizing documents, based on the assumption that the threshold t is 0. The optional step in function block 14 provides for the alteration of t to give a better trade-off between precision and recall, which are common measures of performance in the area of text categorization. This step may be done manually, or by a computer analysis of what value for t works best on the training data. If this step is omitted, then one takes the threshold t to be 0. Finally, the values of w and t are output in function block 15 so that they can be subsequently used by a computer system that categorizes documents, including new documents that have not been used in training.

In FIG. 2, a flow diagram is shown of the steps involved in predicting whether a document is a member of a category using a weight vector w, a threshold t, and the set L of selected features that were used in the determination of w. First, a document d is read in function block 20. A tokenized representation r of the document d is created in function block 21, as further described in FIG. 3. Using r and the selected features L, a vector x is created which represents d, in function block 22, and is further described in FIG. 5. A determination is made in decision block 23 as to whether the inner product of w and x is greater than or equal to t. If not, d is not assigned to the category corresponding to this rule, in function block 24. Otherwise, d is assigned to the category corresponding to this rule, in function block 25. One should note the use of document tokenization, the dependence on the feature selection procedure, and the need to represent documents numerically in a way that parallels what was correspondingly done in the training phase depicted in FIG. 1.

One part of this method is use of a computer to carry out document tokenization, as shown in function block 21. "Tokenization" means extracting a sequence of words or tokens from a sequence of characters. This is shown in detail in FIG. 3. This functionality is common to most methods of text categorization. First, a document d is read in function block 30. The document d is segmented into sections, if any, whose separate identity is significant for categorization in function block 31. For instance, it may be desirable to keep the header separate from the body of a document, in which case, a word extracted from the header would give rise to a different feature from the same word extracted from the body. Each section that contains text is tokenized in function block 32. The steps shown in function blocks 33 and 34 are optional, however, executing these steps may improve performance. All tokens are converted to canonical forms, i.e., stemming, in function block 33. "Stemming" is the replacement of a word by its stem or canonical form, as in replacing plural nouns with singular nouns. Stop words, i.e., common words not useful for categorization, are deleted in function block 34. For example, articles "a", "an", and "the" and prepositions are often found in stop word lists. If both steps (blocks 33 and 34) are performed, they may be performed in either order, because neither has logical precedence over the other, as long as one realizes that the right stop word list to use may be affected by whether stop word elimination comes before or after stemming. Also, the elimination of stop words may in some instances be logically subsumed by subsequent feature selection, to be discussed below.

For consistency, the same tokenization procedure would be used both (1) for documents used in training to build categorization rules and (2) for incoming documents to be categorized by a system employing the rules obtained in the training phase.

After all of the documents in the set of training documents are tokenized, a computer program would be used to carry out feature selection. However, feature selection could be skipped entirely in the event that the total number of different tokens occurring in the document set was moderate in light of the computing resources available, and tokens were to be taken by themselves to be the sole features of interest. In this case, one would replace feature selection by the simpler process of assembling a list of all tokens that occur in the training data. A number of methods of feature selection of varying degrees of sophistication are well known to those skilled in the art and will not be discussed here in detail. As mentioned earlier, the elimination of stop words, if done at all, may be done as part of feature selection, instead of being done as part of tokenization. Feature selection might be done only once for the entire data set, but experience indicates that better results will be obtained by doing feature selection separately for each category, reflecting the intuition that features indicative of category membership will differ as one moves from category to category. Feature selection, under the assumption that a separate set of features is to be selected for each category, is shown in FIG. 4.

Referring now to FIG. 4, feature selection begins with assembling the set of tokenized representations of the training documents in function block 41. From the assembled set, a set of features relevant to document membership in a category is selected in function block 42. The list L of selected features for this training set and this category are then output in function block 43. The output of feature selection would normally be a specification of a separate list of selected features for each category for which we intend to generate a rule. The specification would necessarily be detailed enough to permit a computer to identify each occurrence of each feature in the tokenized representation of a document.

Given a specification of a list of features selected for relevance to the deciding the question of membership in a particular category, another component of the present method is a program to convert a general tokenized representation of a document to numeric vector representing the document, for the purposes of deciding the question of membership in the category. The details of this method are shown in FIG. 5.

Figure 5:
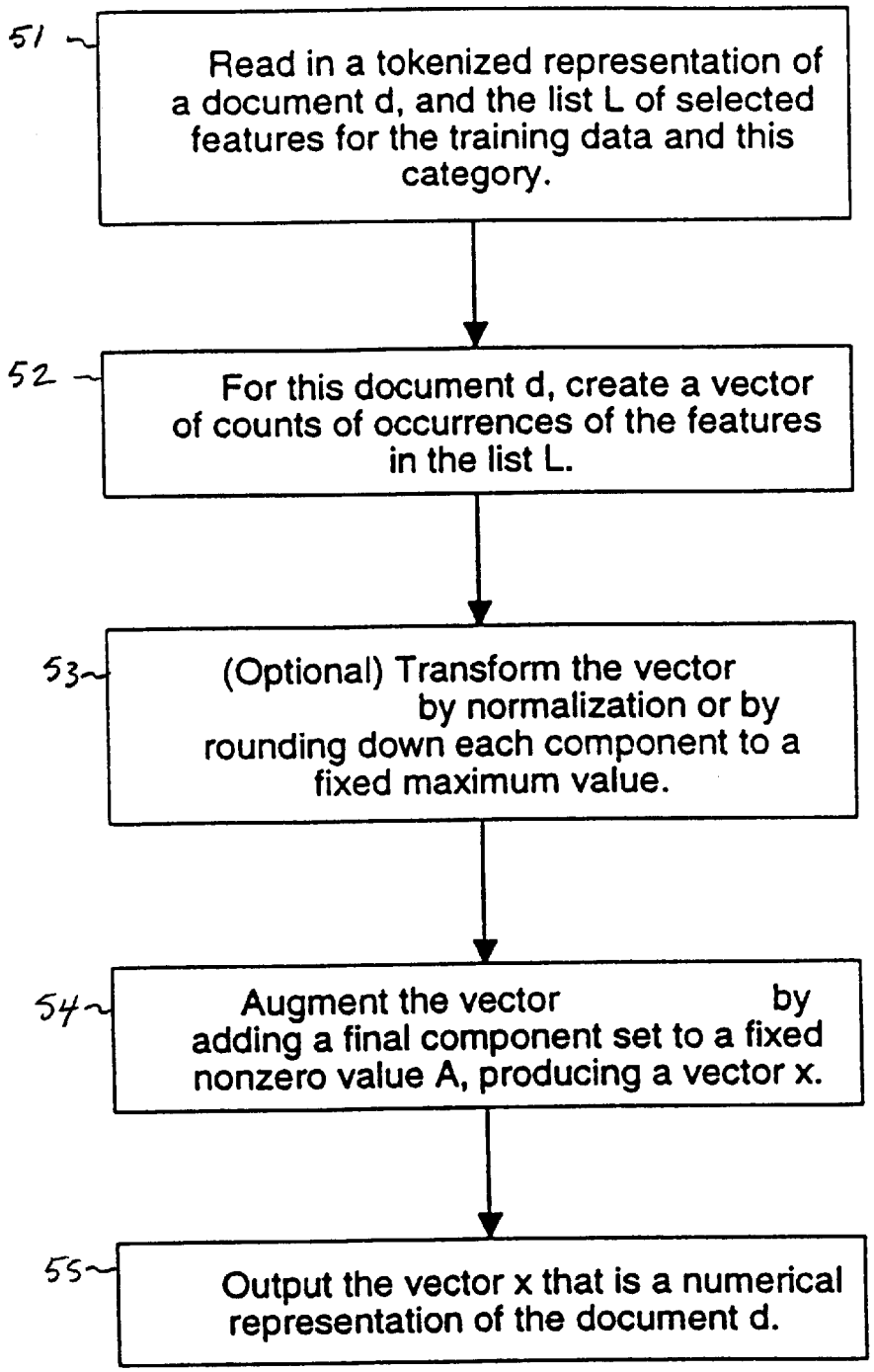
FIG. 5 is a flow diagram showing the steps necessary to use a list of features selected for relevance to a particular category to convert a tokenized representation of a document to a numeric vector representing the document either (1) in the course of finding a linear separator from training data (FIG. 1) or (2) for deciding if the document is in that category (FIG. 2)

Referring to FIG. 5, the first step of this method is to read a tokenized representation of a document d, and the list L of selected features for the training data and this category, in function block 51. A vector of counts of occurrences of the features in the list L is then created for this document d in function block 52. The vector created in block 52 is optionally transformed by normalization or by rounding down each component to a fixed minimum value in function block 53. The vector is then augmented by adding a final component set to a fixed nonzero value A, producing a vector x in function block 54. The vector x which is a numerical representation of the document d is then output in function block 55.

The penultimate step of augmenting the vector by adding a final nonzero component set to A (in function block 54) is meant to enable the assumption that the threshold t may be taken to be zero, at the expense of computing an extra component in the weight vector.

DETAILED DESCRIPTION

The method of the preferred embodiment of the present invention can be viewed as being based on an alternative formulation of the idea of restricting the weights for linear classification rules for the purpose of obtaining good generalization performance. This is explained below.

The mathematical basis for this method is found in Tong Zhang, "Analysis of regularized linear functions for classification problems", IBM Research Report RC21572 (97307), Oct. 13, 1999, where some of the ideas described in the Background section have been generalized to provide generalization performance bounds for a wider class of methods. In Zhang, the property of d-independence has been emphasized. This enables the discovery of new methods which in theory can perform as well as support vector machines when dimensionality of the underlying problem is large. Consider the problem of finding that w that minimizes the empirical loss function.

$$\frac{1}{n} \sum_{i=1}^{n} f(w^T x_i y_i). \tag{4}$$

Note the switch from considering only the error rate on the training data given by function (1) to a close approximation that is obtained by changing function f. To get an efficient and practical algorithm, the function f should be one that is convex and smooth. However, the problem that results may be ill-posed.

To surmount the computational difficulties arising from the above formulation of the empirical loss function to be minimized, Zhang, supra, generalizes the results from Bartlett, supra. In particular, it was shown that if one restricts the p-norm of the weight and the q-norm of the data where $1/p+1/q=1$ and $1<p\leq2$, then the covering number N of f $(w^T x_i y_i)$ in function (4) is independent of d. Similarly, an entropy norm can be used to derive dimension d independent covering number N for $q=\infty$. Furthermore, a weight damping technique to improve generalization performance was analyzed, where the damped p-th norm of $w:\Sigma|a_j w_j|^p$ is restricted, where $w_j$ is the j-th component of w with an appropriately chosen sequence $a_j$. By using these results on covering numbers, the Zhang paper investigated the generalization performance of methods that minimize the following class of criteria:

$$\frac{1}{n}\sum_{i=1}^{n} f(w^T x_i y_i) + sg(w). \tag{5}$$

This is an empirical loss function created by combining a term to measure the training error with a term to constrain the weight vector w. It also serves to regularize the possibly ill-posed problem of finding that w that minimizes the empirical loss function (4).

When g is appropriately chosen, e.g., $$g(w) = \sum_{j=1}^{p} |w_j|^p, \; p > 0, \tag{6}$$

it becomes apparent that the present method can be viewed as being based on an alternative formulation of the idea of obtaining good generalization performance by restricting the weights in a linear classification rule, with the weights measured here by the p-norm of the weight vector.

It was demonstrated that the generalization performance of a linear classifier obtained from the criteria (5) is at most $\tilde{O}O(1/\sqrt{n})$ more than the optimal generalization error, which is independent of d, when every data vector x is small in a certain norm and g is appropriately chosen. Furthermore, by using techniques from asymptotic analysis in statistics, it was shown in Zhang, supra, that the generalization performance of w estimated using criteria (5) depends on $$\frac{1}{2n} tr(V^{-1} U)$$

asymptotically, where V is the expectation of the Hessian of criteria (5) and U is the covariance of the derivative of the criteria (5), both evaluated at the optimal parameter. This formula gives better bounds (asymptotically) than the traditional bounds obtained from computational learning theory. The asymptotic analysis point of view also demonstrates a close relationship of the newly proposed method with the traditional regularization methods in numerical analysis and statistics.

Note that a good choice of f for training a linear classifier according to the present invention should be a decreasing function such that f(0) is close to 1 and f(1) is close to 0, and which, moreover, is convex and sufficiently smooth. A good example is $$f(x) = \begin{cases} (1-x)^p, & x \leq 1 \\ 0, & x > 1 \end{cases} \tag{7}$$

In fact, support vector machines can, at an appropriate level of mathematical abstraction, be regarded as a special case of the criteria (5) with a choice of p=1 in equation (7) and $g(w)=w^T w$. However, the usual implementation of support vector machines is dictated by formulating the problem as a quadratic programming problem, and quadratic programming problems typically require a great deal of computation for solution. The preferred embodiment of the present invention leads to the employment of much simpler and direct numerical techniques. The present approach, i.e., replacing the quadratic programming formulation for support vector machines with the general formation of the criteria (5), performs well in practice.

Algorithmic Approach to Finding the Weight Vector

An algorithm to solve the optimization problem (5) is presented below. For the following description, i denotes the index to the training sample and j denotes the dimension index. For example, $x_{ij}$ means the j-th component of the i-th training sample, and $x_i$; $w_j$ means the j-th component of the weight. In this example g has the form $$g(w) = \sum_{j=1}^{d} g_j(w_j).$$

The methods investigated in this section are based on the following generic relaxation algorithm:

Algorithm 1 (Gauss-Seidel)

let $w=0$ and $r_i=w_T x_i$
    for k=1, 2, . . .
        for j=1, . . . , d
            find $\Delta w_j$ by approximately minimizing $$\frac{1}{n}\sum_{i} f(r_i + \Delta w_j x_{ij} y_j) + sg_j(w_j + \Delta w_j)$$

update r: $r_i=r_i+\Delta w_j x_{ij} y_i$ (i=1, . . . , n)
            update w: $w_j=w_j+\Delta w_j$
        end
    end In the most general case, $\Delta w_j$ can be computed by using a line search algorithm. If f is sufficiently smooth, Newton's method can be employed. However, it does not guarantee global convergence. Therefore, further restriction is desired so it is assumed that $g_j'' \geq 0$ and $f'' \geq 0$. In this case, the formulation (5) is convex. Thus, it has a unique local minimum which is also the global minimum. Furthermore, it is assumed that f'(x) is also convex so that f''(x) is decreasing. This condition can be satisfied by choosing $p \geq 2$ in equation (7). In this case, under the following slight modification of Newton's method, the algorithm converges:

$$\Delta v_j = -\frac{\sum_{i} f'(r_i) x_{ij} y_i + sng_j'(w_j)}{\sum_{i} f''(r_i) x_{ij}^2 + sng_j''(w_j)}, \tag{8}$$

-continued $$r'_i = \begin{cases} r_i & \Delta v_j x_{ij} y_i > 0 \\ r_i + \Delta v_j x_{ij} y_i & \text{otherwise}, \quad (i = 1, \ldots, n) \end{cases}$$

$$\Delta w_j = -\frac{\sum_i f'(r_i) x_{ij} y_i + sng'_j(w_j)}{\sum_i f''(r'_i) x_{ij}^2 + sng''_j(w_j)}.$$

The case p=2 for f(x) given by equation (7) is now considered, where $g_j(w_j) = \alpha_j w_j^2$ and where $\alpha_j$ is a constant. In this case, $f_c''(x)$ is not continuous, which can slow down the convergence of Algorithm 1. An improvement is to introduce a continuation parameter, by considering a parametric family $f_c(x)$ so that $f(x)=f_0(x)$, and the smoothness of $f_c''(x)$ decreases as c goes from 1 to 0. For example, consider the following family:

$$f_c(x) = \begin{cases} (x-1)^2 & x \leq 1 \\ c(x-1)^2 & x > 1. \end{cases} \quad (9)$$

Algorithm 1 should then be modified so that at each step k, a different $c_k$ is chosen (so that $1 = c_1 \geq c_2 \geq \ldots \geq c_K = 0$), and the function f shall be replaced by $f_{c_k}$. Since this is the case of focus, the resulting algorithm (called quasi-least square or QLS) to train a linear classifier is summarized in the following:

Algorithm 2 (QLS)

let w=0 and $r_i = w^T x_i$ pick a decreasing sequence of $1 = c_1 \geq c_2 \geq \ldots \geq C_K = 0$ for k=1, 2, . . . , K define function $C_k(x)=1$ if $x \geq 1$ and $C_k(x)=c_k$, otherwise for j=1, . . . , d $\Delta v_j = -[\Sigma_i C_k(r_i)(r_i-1)x_{ij}y_j + sn\alpha_j w_j]/[\Sigma_i C_k(r_i)x_{ij}^2 + sn\alpha_j]$ $q_i = r_i + \Delta v_j x_{ij} y_i$ (i=1, . . . , n)

$\Delta w_j = -[\Sigma_i C_k(r_i)(r_i-1)x_{ij}y_j + sn\alpha_j w_j]/[\Sigma_i C_k(\min(r_i,q_i))x_{ij}^2 + sn\alpha_j]$ update r: $r_i = r_i + \Delta w_j x_{ij} y_i$ (i=1, . . . , n)
update w: $w_j = w_j + \Delta w_j$ end end

Altering the Threshold

An algorithm for computing the weight vector along with its theoretical justification has been presented. Below is a discussion of the matter of the threshold. In text categorization, it frequently happens that each category contains only a small percentage of documents. When this happens, the standard measure of performance in machine learning—classification error—is often not the most useful measure, because one can get a low error rate simply by saying no item is in any class, which is not likely to result in a very useful categorizer. In text categorization, the standard performance measures of a classification method are the precision and recall instead of classification error:

$$\text{precision} = \frac{\text{true positive}}{\text{true positive} + \text{false positive}} \times 100$$

$$\text{recall} = \frac{\text{true positive}}{\text{true positive} + \text{false negative}} \times 100$$

With the measures of precision and recall in mind, and having obtained a weight vector w and a corresponding threshold t=0 by the procedure described above, one may optionally consider next the effect of varying t while holding the previously obtained w fixed. One should keep in mind the geometric intuition: w determines only the slope of the classifying hyperplane, and then t determines its precise position, effectively selecting exactly one hyperplane out of the set of parallel hyperplanes that are orthogonal to w. By varying t in this way, in many cases one can trade precision for recall, and vice versa. More precisely, on the training set one can evaluate the precision and recall of the categorization rule $$w^T x \geq t$$

for a variety of values of t, choosing the one that gives the best balance between precision and recall as determined by the practical problem at hand. Or, one could choose a value of t different from 0 on the basis of other heuristic considerations.

Experimental Results

Algorithm 2 (QLS) has been compared to other algorithms with respect to their effect on the text categorization problem. One algorithm is a state of the art decision tree (Dtree) induction component of the Corepoint Mail Analyzer product offered by International Business Machines Corp. (IBM), which compares favorably with other decision tree algorithms such as the one in IBM Intelligent Miner for Data (SPRINT) or C4.5 (see, J. Shafer, R. Agrawal, and M. Mehta, "SPRINT: A Scalable Parallel Classifier for Data Mining", *Proceedings of the 22nd International Conference of Very Large Databases* (1996)) Also included are results from SPRINT which uses the feature selection method described by S. M. Weiss et al., supra, for comparison. The other algorithm is the linear least square fitting (in the style of LLSF, Yiming Yang et al., supra). Also included is a boosted version of the Dtree with 10 trees (BOOST-10).

The standard data set for comparing text categorization algorithms is the Reuters set of news stories, publicly available at http://www.research.att.com/~lewis/reuters21578.html Reuters-21578 is used with ModApte split to partition the documents into training and validation sets. The ModApte split is a standard partition of this data into a training set and a test set. It is described in detail in documentation to be found at the above World Wide Web URL (uniform resource locators) address. If the classification algorithm contains a parameter that can be adjusted to facilitate a trade-off between precision and recall, then one can compute the break-even point, where precision equals recall, as an evaluation criterion for the performance of a classification algorithm. In the general case of an arbitrary classification algorithm, one can use the average of precision and recall to stand for the break-even point.

The input variable to the classifiers is a vector of the number of occurrences of words in a document. For each class, the IG criterion studied by Y. Yang and J. P. Pedersen in "A comparative study on feature selection in text categorization", ICML'97, *Proceedings of the Fourteenth*

*International Conference on Machine Learning* (1997), is applied as the feature selection method and 500 features are used for the algorithms (except BOOST-10 which uses 1000 features and SPRINT which uses a different method for feature selection).

Note that the current best reported performance on the Reuters data with ModApte split is the boosting algorithm reported by, S. M. Weiss et al., supra, which achieves a 87.8 break-even point with 100 trees. If 10000 features (instead of 500 features) are used for QLS, a break-even point of 87.7 is obtained for the Reuters data set, which is a much better result than the result (with 500 features), as reported in Table 1, below. This demonstrates that large dimensionality does not degrade the performance of QLS. The C4.5 algorithm (which has break-even point approximately 80) appears to perform less well on this data set when compared with Dtree or SPRINT.

TABLE 1

Summary of results with 500 features

|  | QLS | LLSF | Dtree | BOOST-10 | SPRINT |
|---|---|---|---|---|---|
| Reuters | | | | | |
| precision | 90.0 | 86.3 | 87.0 | 89.0 | 88.2 |
| recall | 83.2 | 79.3 | 80.5 | 84.0 | 78.3 |
| average | 86.6 | 82.8 | 83.7 | 86.5 | 83.3 |
| ASKIBM | | | | | |
| precision | 76.2 | 66.7 | 75.8 | 69.8 | 75.3 |
| recall | 49.1 | 49.5 | 45.5 | 52.1 | 44.5 |
| average | 62.6 | 58.1 | 60.6 | 61.0 | 59.9 |
| AS400 | | | | | |
| precision | 76.6 | 74.4 | 75.3 | 75.7 | 76.4 |
| recall | 67.2 | 66.5 | 63.4 | 72.2 | 61.6 |
| average | 71.9 | 70.4 | 69.4 | 74.0 | 69.0 |

In Table 1, above, comparative results on two other data sets are shown. One (ASKIBM) was obtained from IBM e-mail messages. This data, categorized into 84 classes, was partitioned into a training set of 37485 items and a test set of 8895 items. In reviewing the results, the readers should keep in mind that the ASKIBM data was fairly "dirty" in that it contained many misclassified items, The other data set (AS400) consisted of records of call center inquiries from customers. This data, categorized into 29 classes, was partitioned into a training set of 59557 items and a test set of 14235 items. Results are summarized in Table 1. On well-categorized (i.e., not dirty) data from IBM customers, much better precision and recall was obtained than in the reported result. The relative performances of the algorithms are very consistent. Note that throughout the experiments, s is set at 0.001, K=100 and $C_k$=max(0, 1−k/50) in Algorithm 2. For simplicity, $\alpha_j$ is set to 1. However, when more features are used, an appropriately chosen damping technique ($\alpha_j$ increases with j) can improve the generalization performance. The threshold t is fixed to be −0.25 for QLS and LLSF. The reason for this choice of t is to adjust the precision and recall of the linear classifiers so that they are approximately in the same range as the other algorithms.

As described above, the preferred embodiment of the present invention is a new formulation for training linear classifiers as well as a numerical algorithm to solve this formulation. While theoretical results from Zhang, supra, show that this method is related to support vector machines, the new formulation is more general and more amenable to traditional unconstrained numerical methods. The new method has been applied to the text categorization problem and has demonstrated that it is very competitive with other methods. Moreover, the new method is consistently better than linear classifiers trained by the least square method and better than decision tree classifiers without boosting. Algorithm 2 is also very fast, with the program taking about ten minutes for the 118 class Reuters data set on a 120 MHz Pentium PC running Linux.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A method of supervised learning for the purpose of text categorization, said method comprising the steps of:
    modifying training error for a set of categorized training documents by expressing the training error as a function which describes an ill-posed problem and replacing the ill-posed problem function with a convex function which approximates the ill-posed problem function;
    deriving a convex optimization problem from the modified training error function by finding a weight vector w whose dot product with vectors derived from the training documents minimizes the modified training error function;
    regularizing the convex optimization problem by adding a convex term, said convex term being dependent only on weight vector w;
    solving the problem by relaxation, wherein components of the weight vector w are optimized one component at a time.

2. A method as recited in claim 1, further comprising the step of determining a threshold t to be used in conjunction with the weight vector w in formulating a rule for categorizing a document d with respect to membership in a category C such that d is assigned to C if $w^T x \geq t$ or d is not assigned to C if $w^T x < t$, wherein x is a vector derived from a document d, and wherein said determining is based on obtaining a desired trade-off between precision and recall, and wherein $w^T x$ is a dot product of w and x.

3. A method as recited in claim 1, wherein the training error for a set of n training documents is defined by $$\frac{1}{n}\sum_{i=1}^{n} f(w^T x_i y_i),$$

where f is a step function $$f(x) = \begin{cases} 1 & \text{if } x \leq 0 \\ 0 & \text{if } x > 0, \end{cases}$$

w is a weight vector, x, is a vector derived from an $i^{th}$ training document, $y_i \in \{+1, -1\}$ is a label designating whether or not the $i^{th}$ document is in a particular category C, $w^T x$ is a dot product of w and x, and wherein the modified training error for a set of n training documents is defined by $$\frac{1}{n}\sum_{i=1}^{n} f_{mod}(w^T x_i y_i),$$

where $f_{mod}$ is a convex approximation of the step function f, thereby creating a convex optimization problem, said problem being to find a value w that minimizes the modified training error.

4. A method as recited in claim 3, further comprising the step of selecting values for parameters to define an empirical loss function $F_{f,g,s}(D,w)$, of the form $$F(D, w) = F_{f,g,s}(D, w) = \frac{1}{n}\sum_{i=1}^{n} f_{mod}(w^T x_i y_i) + sg(w),$$

thereby modifying the training error to create a regularized convex optimization problem, said problem being to find a value for w that minimizes $F(D,w)$, where D is a set $\{x_i, y_i\}$ of vectors derived from categorized training documents, g is a smooth function expressible as a sum of real-valued functions, each real-valued function being a function of exactly one component of the weight vector w, and s is a small positive real number establishing a balance in the resulting optimization problem between minimizing an error rate on the training data and ensuring weights are not too large.

5. A method as recited in claim 4, wherein the step of solving the problem by relaxation further comprises the steps of:
   assembling a set of tokenized representations of a set of training documents with a list L of selected features for the set of training documents for a selected category;
   creating a set D of numerical vector representations of the set of training documents using the list L of selected features;
   determining a weight vector w that minimizes $F(D,w)$ by using a relaxation algorithm that takes the set D as input; and
   providing the determined weight vector w and determined threshold t.

6. A method as recited in claim 5, wherein the step of creating the set D of numerical vector representations, further comprises the steps of:
   for each document d in the set D,
      inputting a tokenized representation of document d, and the list of selected features L for the training data for the selected category;
      creating a vector of counts of occurrences of each feature in the set of features L for the inputted document d;
      augmenting the vector created in the creating step by adding a final component set to a fixed non-zero value A, and producing a new augmented vector x; and
      providing the augmented vector x as a numerical representation of the document d.

7. A method as recited in claim 6, further comprising the step of transforming each numerical vector representation of a training document d by normalizing each vector or by rounding down each component of a vector to a fixed minimum value.

8. A method of supervised learning for the purpose of text categorization, said method comprising the steps of:
   selecting values for parameters which determine an empirical loss function $F_{f,g,s}(D,w)$, of the form $$F(D, w) = F_{f,g,s}(D, w) = \frac{1}{n}\sum_{i=1}^{n} f_{mod}(w^T x_i y_i) + sg(w),$$

thereby modifying by approximation a training error function for a set of n categorized training documents and then regularizing the function thereby approximated to create a regularized convex optimization problem, wherein the training error function to be thereby approximated is defined by $$\frac{1}{n}\sum_{i=1}^{n} f(w^T x_i y_i),$$

where f is a step function $$f(x) = \begin{cases} 1 & \text{if } x \leq 0, \\ 0 & \text{if } x > 0 \end{cases}$$

w is a weight vector, D is a set $\{x_i, y_i\}$ of vectors derived from categorized training documents such that $x_i$ is a vector derived from an $i^{th}$ training document, $y_i \in \{+1, -1\}$ is a label designating whether or not the $i^{th}$ document is in a particular category C, $w^T x$ is a dot product of w and x, and wherein the training error function thereby modified by approximation for a set of n training documents is defined by $$\frac{1}{n}\sum_{i=1}^{n} f_{mod}(w^T x_i y_i),$$

where $f_{mod}$ is a convex approximation of the step function f, and wherein $f_{mod}$ is regularized by the addition of a convex term g, g being a smooth function expressible as a sum of real-valued functions, each real-valued function being a function of exactly one component of the weight vector w, and s is a small positive real, number establishing a balance in the resulting optimization problem between minimizing an error rate on the training data and ensuring weights are not too large;
   assembling a set of tokenized representations of a set of training documents with a list L of selected features for the set of training documents for a selected category;
   creating a set D of numerical vector representations of the set of training documents using the list L of selected features;
   determining a weight vector w that minimizes $F(D,w)$ by using a relaxation algorithm that takes the set D as input, and
   providing the determined weight vector w by optimizing components of weight vector w one component at a time.

9. A method as recited in claim 8, further comprising the step of determining a threshold t to be used in conjunction with the weight vector w in the formulation of a rule for categorizing a document d with respect to membership in a category C such that d is assigned to C if $w^T x \geq t$ or d is not assigned to C if $w^T x < t$, wherein x is a vector derived from a document d, and wherein said determining is based on obtaining a desired trade-off between precision and recall.

10. A method as recited in claim 8, wherein the assembling step further comprises the steps of:
   inputting a document d, where d is a member of the training set of documents D;
   segmenting the document d into sections, each section being significant for categorization;
   generating tokens for each section that contains text; and
   providing a tokenized representation r of the document d from which a list of tokens in each section can be determined.

11. A method as recited in claim 10, further comprising the steps of:
   assembling a set of tokenized representations including each document d of the training set of documents D; and
   selecting a set of features L relevant to document membership in the selected category for the training set.

12. A method as recited in claim 10, further comprising the step of converting each generated token to a canonical form.

13. A method as recited in claim 10, further comprising the step of deleting tokens not useful for categorization.

14. A method as recited in claim 8, wherein said relaxation algorithm to determine the weight w comprise the steps of:
   initializing w=0 and $r_i = w^T x_i$;
   picking a decreasing sequence of $1 = c_1 \geq c_2 \geq \ldots \geq c_K = 0$
   for k=1, 2, ..., K
      defining function $C_k(x) = 1$ if $x \leq 1$ and $C_k(x) = c_k$, otherwise
      for j=1, ..., d calculating $\Delta v_j = -[\Sigma_i C_k(r_i)(r_i-1)x_{ij}y_j + sn\alpha_j w_j]/[\Sigma_i C_k(r_i)x_{ij}^2 + sn\alpha_j]$, $q_i = r_i + \Delta v_j x_{ij} y_i$ (i=1, ..., n), and $\Delta w_j = -[\Sigma_i C_k(r_i)(r_i-1)x_{ij}y_j + sn\alpha_j w_j]/[\Sigma_i C_k(\min(r_i,q_i))x_{ij}^2 + sn\alpha_j]$;

updating r: $r_i = r_i + \Delta w_j x_{ij} y_i$, where, i=1, ... n;
   updating w: $w_j = w_j + \Delta w_j$
   where $x_1, x_2, \ldots, x_{ij}$ are d-dimensional vectors derived from the set of training documents and $x_{ij}^2$ is a $j^{th}$ component of $x_i$, $y_i \epsilon \{+1, -1\}$ is a label designating whether the $i^{th}$ training document is in a particular category C, $\alpha_1, \alpha_2, \ldots, \alpha_{ij}$ are constants, K is a constant determining a number of iterations to be performed, $r_1, r_2, \ldots, r_n$ and $q_1, q_2, \ldots, q_n$ are real variables; and
   providing determined value for w to accompany a provisional value of t=0.

15. A method as recited in claim 14, further comprising the step of determining a threshold t to be used in conjunction with the weight vector w in the formulation of a rule for categorizing a document d with respect to membership in a category C such that d is assigned to C if $w^T x \geq t$ or d is not assigned to C if $w^T x < t$, wherein x is a vector derived from a document d, and wherein said determining is based on obtaining a desired trade-off between precision and recall.

16. A method for predicting whether a document is a member of a category using a weight vector w, a threshold t, and a set L of selected features that were used in the determination of w, said method comprising the steps of:
   inputting a document d;
   creating a tokenized representation r for document d;
   creating a a vector x which represents d by using r and the selected features L;
   determining whether for a rule defined as an inner product of w and x being greater than or equal to t, and if so, assigning d to the category corresponding to this rule, but if not, refraining from assigning d to the category corresponding to this rule,
   wherein w is determined by:
      modifying a training error function for a set of n categorized training documents, wherein the training error function to be modified is defined by $$\frac{1}{n}\sum_{i=1}^{n} f(w^T x_i y_i),$$

where f is a step function $$f(x) = \begin{cases} 1 & \text{if } x \leq 0, \\ 0 & \text{if } x > 0 \end{cases}$$

w is a weight vector, $x_i$ is a vector derived from an $i^{th}$ training document, $y_i \epsilon \{+1, -1\}$ is a label designating whether or not the $i^{th}$ document is in a particular category C, $w^T x$ is a dot product of w and $x_i$ and wherein the modified training error function for a set of n training documents is defined by $$\frac{1}{n}\sum_{i=1}^{n} f_{mod}(w^T x_i y_i),$$

where $f_{mod}$ is a convex approximation of the step function f;
   deriving a convex optimization problem from the modified training error function by finding a value of weight vector w that minimizes the modified training error function;
   regularizing the convex optimization problem by adding a convex term, said convex term being dependent only on weight vector w;
   solving the problem by relaxation, thereby obtaining a weight vector w that minimizes the modified training error by optimizing components of weight vector w one component at a time.

17. A method as recited in claim 16, wherein a value for the threshold t is to be used in conjunction with the weight vector w in the formulation of a rule for categorizing a document d with respect to membership in a category C such that d is assigned to C if $w^T x \geq t$ or d is not assigned to C if $w^T x < t$, wherein x is a vector derived from a document d, and wherein said determining is based on obtaining a desired trade-off between precision and recall.

18. A method as recited in claim 16, wherein the step of creating a vector x further comprises the steps of:
   inputting a tokenized representation of document d, and the list of selected features L for the training data D for the selected category;
   creating a vector of counts of occurrences of each feature in the set of features L for the inputted document d;
   augmenting the vector created in the creating step by adding a final component set to a fixed non-zero value A, and producing a new augmented vector x; and
   providing the augmented vector x as a numerical representation of the document d.

19. A method as recited in claim 18, further comprising the step of transforming the vector x created in the creating step by normalizing or rounding down each component to a fixed minimum value.

20. A method as recited in claim 16, wherein the step of creating a tokenized representation r for each document d further comprises the steps:
   segmenting the document d into sections, each section being significant for categorization;
   generating tokens for each section that contains text; and
   providing a tokenized representation r of the document d from which a list of tokens in each section can be determined.

21. A system of supervised learning for the purpose of text categorization, comprising:

a computing device having memory and means for processing;

means for inputting a set of training documents;

means for modifying a training error for a set of categorized training documents by expressing the training error as a function which describes an ill-posed problem and replacing the ill-posed problem function with a convex function which approximates the ill-posed problem function;

means for deriving a convex optimization problem from the modified training error function by finding a weight vector w whose dot product with vectors derived from the training documents minimizes the modified training error function;

means for regularizing the convex optimization problem by adding a convex term, said convex term being dependent only on weight vector w; and computer code in said memory implementing the step of solving the problem by relaxation, wherein components of the weight vector w are optimized one at a time, the solution to the problem being available for further processing using processing means in order to categorize text.

22. A system for predicting whether a document is a member of a category using a weight vector w, a threshold t, and a set L of selected features that were used in the determination of w, comprising:

a computing device having memory and means for processing;

means for inputting documents;

means for modifying a training error for a set of categorized training documents by expressing the training error as a function which describes an ill-posed problem and replacing the ill-posed problem function with a convex function which approximates the ill-posed problem function;

means for deriving a convex optimization problem from the modified training error function by finding a weight vector w whose dot product with vectors derived from the training documents minimizes the modified training error function;

means for regularizing the convex optimization problem by adding a convex term, said convex term being dependent only on weight vector w; ad a first computer code section in said memory implementing the step of solving the convex optimization problem by relaxation, wherein components of the weight vector w are optimized one at a time, the solution to the problem being available for further processing using processing means in order to categorize text;

a second computer code section in said memory implementing the step of inputting a document d;

a third computer code section in said memory implementing the step of creating a tokenized representation r for document d;

a fourth computer code section in said memory implementing the step of creating a a vector x which represents d by using r and the selected features L; and a fifth computer code section in said memory implementing the step of determining whether for a rule defined as an inner product of w and x being greater than or equal to t, and if so, assigning d to the category corresponding to this rule, but if not, refraining from assigning d to the category corresponding to this rule, wherein w is determined by processing the first code section in said memory to solve the problem by relaxation.

* * * * *